June 23, 1970     A. F. SCARPELLI ET AL     3,517,154
ELECTRICAL DISCHARGE MACHINING APPARATUS
Filed Sept. 15, 1966
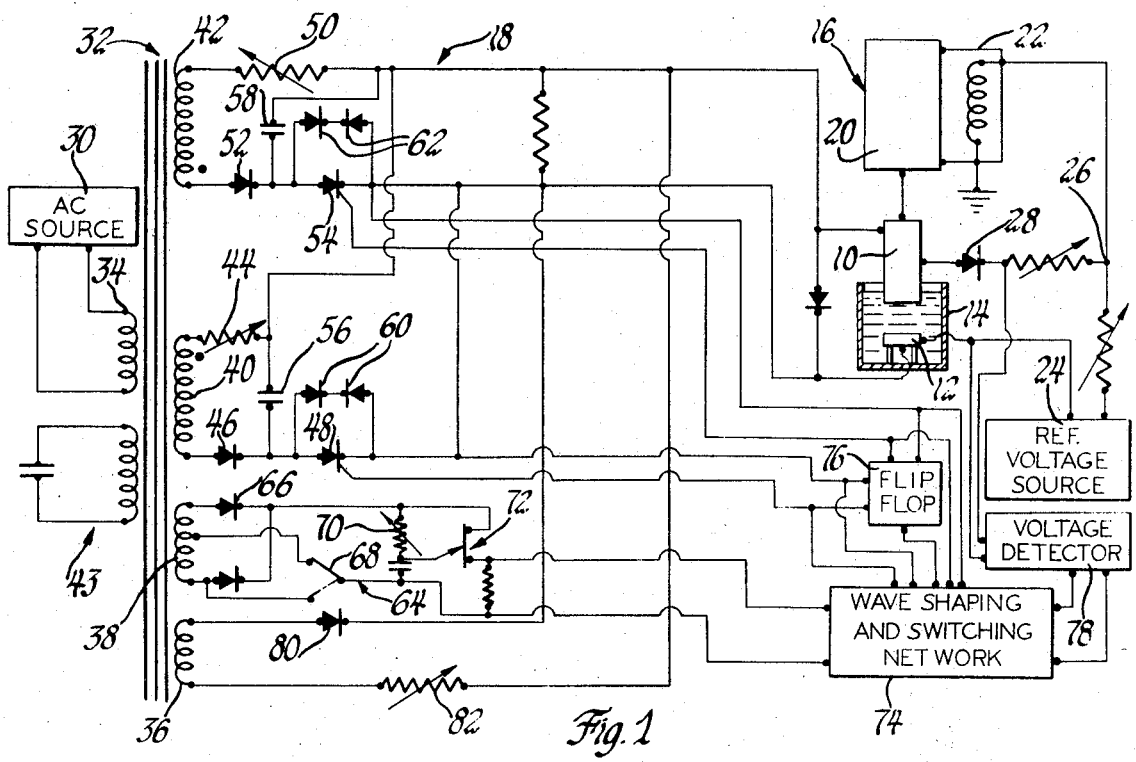
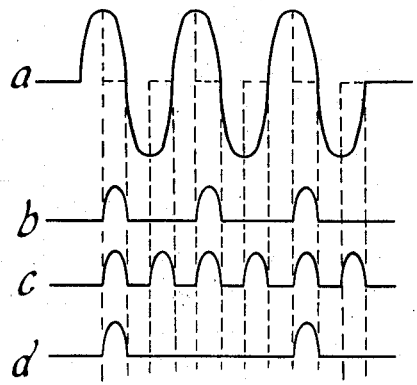
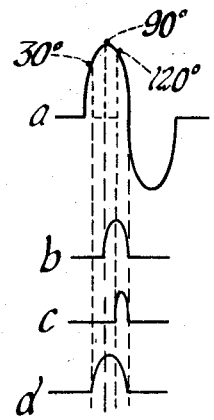
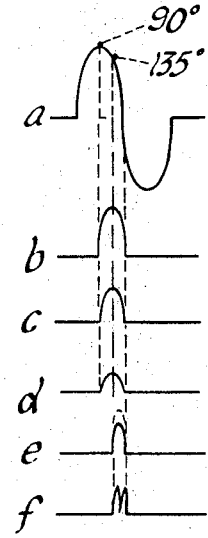
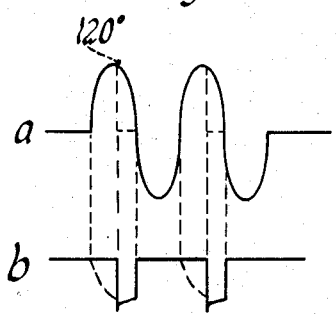
INVENTORS
August F. Scarpelli,
Millard A. Ferguson &
BY John J. Ross
ATTORNEY United States Patent Office  3,517,154
Patented June 23, 1970

3,517,154
ELECTRICAL DISCHARGE MACHINING APPARATUS
August F. Scarpelli, Warren, Millard A. Ferguson, Utica, and John J. Ross, Warren, Mich., assignors to General Motors Corporation, Detroit, Mich., a corporation of Delaware
Filed Sept. 15, 1966, Ser. No. 579,660
Int. Cl. B23p 1/08
U.S. Cl. 219—69                                  2 Claims

ABSTRACT OF THE DISCLOSURE

An electrical discharge machining power supply employing AC energy in combination with controlled rectifiers. The triggering circuit operates the controlled rectifiers so that the energy applied to the gap can be varied as to frequency, pulse width and amplitude. Also, the average voltage across the gap is increased so as to avoid instability of the gap spacing control, and short circuiting is detected by a gap voltage detector, which causes the power to be cut off.

---

This invention relates to improvements in electrical discharge machining apparatus and particularly to the power supplies therefor.

The electrical discharge machining process has many diverse applications and can be carried out rather effectively with AC power that is half-wave rectified. To more effectively machine workpieces such as cutting dies to a relatively accurate final dimension and with the desired finish, it is necessary to control the parameters of the pulsating energy applied to the gap, e.g., the duration, amplitude, frequency and the time during the cycle of the source that the discharges occur. This parameter control is understandably difficuilt if an inexpensive power supply is an objective.

Therefore, contemplated by the invention is a new and different power supply for precisely controlling the parameters of the pulsating energy to be applied to the machining gap. Somewhat more specifically there is contemplated a novel, uncomplicated provision for varying one or more of the pulsating energy parameters including the duration of the pulses, the phase relationship of the occurrence of the pulses to the source cycle, and the amplitude of the pulses.

Also proposed is a unique provision for increasing the average gap voltage for gap spacing control purposes when the pulse of energy applied to the gap are of a short duration; provision for controlling pulse amplitude although the pulses are of a short duration and occur near the virtual zero voltage point of the source pulses; and provision for splitting pulses supplied to the gap.

In a preferred embodiment of the invention an AC source is coupled to the machining gap formed between the cutting tool and workpiece electrodes by a transformer. The transformer has two secondary windings connected in parallel and each across the gap. These windings produce gap discharges when connected by controlled rectifiers to the gap at frequencies that can be varied. This frequency variation is achieved by a triggering circuit for the controlled rectifiers and also by the use of a frequency divider. Additionally, the width, duration and amplitude of the pulses supplied to the gap are all adjustable to achieve optimum operation. This includes the use of capacitors to increase the amplitude of the pulses when they are of a narrow width and also utilizing an additional secondary winding for increasing the average gap voltage sensed by the gap spacing control so as to provide more stable operation and also to reset a gap voltage detector which interrupts machining when a short circuit occurs.

The foregoing and other objects and advantages of the invention will become apparent from the following description and from the accompanying drawings in which:

FIG. 1 is a schematic diagram of electrical discharge machining apparatus incorporating the principles of the invention; and FIGS. 2–5 are voltage-time diagrams relating to different aspects of the operation of the FIG. 1 apparatus.

First referring to FIG. 1, the numerals 10 and 12 designate electrodes, which will hereinafter be respectively referred to as the cutting tool and the workpiece. The workpiece 12 is positioned within a tank 14 containing a suitable dielectric fluid provided from a source, not shown. Either or both the cutting tool 10 and the workpiece 12 may be maneuvered relative to each other so as to maintain some preferred gap spacing, as determined by a gap spacing control denoted generally at 16. Power is supplied to the gap by a power supply, designated generally by the numeral 18, and electrical shock removing discharges occur across the gap in a well known way. In the meantime the gap spacing control 16 is continuously operative to maintain the preferred gap spacing or that which provides the most effective machining results. The polarities of the cutting tool 10 and the workpiece 12 may be conventional; i.e., with the cutting tool 10 negative and the workpiece 12 positive, or these polarities may be reversed.

The gap spacing control 16 may be of any suitable type, such as that shown in the Colten et al. Pat. 3,059,150 and the Ferguson Pat. 3,213,257. For the FIG. 1 apparatus the control 16 includes a motor 20, preferably of the fluid-pressure actuated type, that is controlled by a force motor 22. A reference voltage source 24 supplies a reference voltage corresponding to the desired gap spacing to a summing junction 26 where the reference voltage and the gap voltage, which is rectified by rectifier 28, are compared. Any differential results in an error signal, which is applied to the force motor 22. The fluid pressure actuation of the motor 20 is accordingly varied to increase the gap or decrease it, as determined by the error signal. Thus, if at the desired spacing, the gap voltage is a negative 60 volts, the reference voltage is a positive 60 volts and the summation at the junction 26 will provide a null error signal. However, if the gap voltage diminishes, a positive error signal will result and the motor 20 will accordingly act to increase the gap spacing.

The power supply 18 employs an AC source 30 which provides alternating energy at some selected frequency; by way of example, 10 kilocycles. The AC source 30, as a suggestion only, may be an oscillator or a motor-generator set. The coupling of the AC source 30 to the gap is done by a transformer 32. This transformer 32 includes a primary winding 34, which is connected to the AC source, and a series of secondary windings including a voltage detector reset and motor control winding 36, a triggering winding 38 and two secondary cutting windings 40 and 42. These cutting windings 40 and 42 are connected in parallel across the gap and are shown as separate windings. However, it is contemplated that an appropirate single center tapped secondary winding may be used. Also included is a tank circuit 43. The tank circuit 43, as explained in detail in the aforementioned Pat. 3,213,-257, affords power factor compensation and a continuously available reserve of energy.

The function of the two cutting windings 40 and 42 will be first explained. It will be noted that not only are these two windings 40 and 42 connected in parallel, but also as the dot indicates they are so wound that their corresponding ends are always at opposite polarities for reasons to be discussed. The cutting winding 40 has in series therewith a variable resistor 44, a rectifier 46, and a controlled rectifier 48; whereas the cutting winding 42 has in series therewith a variable resistor 50, a rectifier 52, and a controlled rectifier 54. In parallel with the cutting winding 40 is a capacitor 56, and in parallel with the cutting winding 42 is a capacitor 58. Both of the controlled rectifiers 48 and 54 may be commercially available silicon controlled rectifiers of the avalanche type. For protecting these controlled rectifiers 48 and 54 against damage from transients, back-to-back diodes 60 and 62 are arranged respectively in shunt therewith.

A triggering circuit, denoted generally at 64, provides trigger pulses to the controlled rectifier in a controlled phase relationship to the output from the AC source 30, as will be explained in detail. The circuit 64, in addition to the triggering winding 38, includes a rectifier, denoted generally by the numeral 66, that will provide half-wave or full-wave rectification according to the position of a selector switch 68 in a well known way. This rectified energy is applied to an adjustable RC network 70 in the emitter circuit, which is the input, to a unijunction transistor 72. The RC network 70 determines the point along the excursion of the input pulse, which of course is in phase with the output from the AC source 30, that the unijunction transistor 72 fires. An output trigger pulse is then developed at the transistor output, which is the base circuit, and supplied to a wave shaping and switching network 74. This network 74 shapes these trigger pulses, if needed, before application to the gate electrodes of the controlled rectifiers 48 and 54 to achieve optimum turn-on. The switching of the network 74, as will be discussed, is for selectively altering the frequency of the pulsating energy applied to the gap and can be done by any suitable switch, as will be readily understood by those versed in the art.

To explain the operation of the triggering circuit 64, it will first be assumed that the pulses applied to the gap are to be at the 10 kc. frequency of the AC source 30. Hence, the switch 68 is placed in the solid line position shown so that half-wave rectification is achieved by the rectifier 66. Consequently, one trigger pulse is developed by the unijunction transistor 72 for each cycle of the AC source 30. Also, the shaping and switching network 74 is so adjusted that the triggering pulses are simultaneously applied to the two controlled rectifiers 48 and 54. Since the polarities of the two cutting windings 40 and 42 are opposite, as mentioned, then only one, e.g., cutting winding 40, will have the proper forward bias for conduction and will apply a machining pulse to the gap. This is demonstrated in FIG. 2, where FIG. 2a portrays the waveform of the pulses from the source 30 and FIG. 2b the waveform of the discharge pulses supplied to the gap at the 10 kc. frequency. The trigger pulses would, of course, also have a waveform similar to that shown in FIG. 2b.

Of course, if additional power was required, then suitable provision could be made for adjusting the polarity relationship of the windings 40 and 42 so as to be the same. With windings 40 and 42 having the same polarity, the rectifiers 48 and 54 would fire simultaneously. The peak gap current would consequently be greater than with a single winding.

If it is desired now that the frequency of the pulses applied to the gap be decreased, any suitable frequency divider can be utilized, such as a well known flip-flop, identified by the numeral 76. The switch 68 will be maintained in the half-wave rectification position but now the shaping and switching network 74 will be adjusted so that the output trigger pulses therefrom go only to the input of the flip-flop 76. This trigger pulse will cause the flip-flop 76 to change its state, which will be referred to as output state, and an output pulse will be applied to the control or gate electrodes of both of the controlled rectifiers 48 and 54. Again, only one of the windings 40 or 42 will be effective unless their polarities are alike and a corresponding pulse will be applied to the gap. The next trigger pulse from the unijunction transistor 72 and delivered by the shaping and switching network 74 to the input of the flip-flop 76 causes the flip-flop 76 to revert to its other state in which no output is developed. Hence, there will be no trigger pulse delivered to the gate electrodes of the controlled rectifiers 48 and 54 during the subsequent cycle of the source 30. The next cycle of the source will produce again the trigger pulse at the output of the unijunction transistor 72 and it will cause the flip-flop 76 to return to the output state in which another output pulse is developed for triggering the controlled rectifiers 48 and 54. Therefore, a pulse is delivered to the gap on every other cycle of the source 30. This divides the source frequency in half so that the pulses delivered to the gap are at a 5 kc. frequency, as seen in FIG. 2d.

Provision is also made for increasing the frequency of the pulses delivered to the gap; i.e., increasing the frequency of the pulses relative to the frequency of the AC source 30. To do this the switch 68 is positioned in the full-wave rectifier position, shown in dotted line. Consequently, the unijunction transistor 72 will develop an output per each incoming pulse or two per each cycle of the AC source 30. The shaping and switching network 74 is returned to the position in which shaped trigger pulses shunt the flip-flop 76 and are delivered directly to the gate electrodes of the controlled rectifiers 48 and 54. Now, as will be appreciated, with the cutting winding 40 assumed to have the proper polarity for the controlled rectifier 48 to conduct, a machining pulse will be provided to the gap from the cutting winding 40. None, of course, will be supplied by the opposite poled cutting winding 42. The second trigger pulse during this cycle delivered to the gate electrodes of the controlled rectifiers 48 and 54 will cause the controlled rectifier 54 to conduct since now the polarity of the voltage from the cutting winding 42 will be proper for conduction and a pulse will be supplied from the cutting winding 42 to the gap. This results in two pulses being applied to the gap per cycle of the AC source 30 and, therefore, the frequency of the pulsating energy supplied to the gap is now 20 kc., as illustrated in FIG. 2c.

Reference is next made to FIG. 3, and specifically FIG. 3a, showing the voltage waveform of an output pulse from the AC source 30 and points along the excursion of the voltage, specifically at 30, 90 and 120 electrical degrees. The remaining FIGS. 3b, 3c and 3d illustrate the waveform of the pulses applied to the gap. As can be appreciated, the width of the gap pulses can be varied by changing the conduction firing point of the controlled rectifiers 48 and 54. This is done by adjusting the triggering circuit's RC network 70 so that the unijunction transistor 72 fires at the appropriate point along the excursion of the output pulse from the AC source 30. In FIG. 3b the triggering pulse caused the controlled rectifiers to be fired at the 90° point, in FIG. 3c at the 120° point, and in FIG. 3d at the 30° point. Consequently, a substantial variation in pulse width is possible to meet the requirements of different applications of the electrical discharge machining process.

The amplitude adjustment of the pulses applied to the gap will be described while referring to FIG. 4. Again, FIG. 4a represents the waveform of the output pulse from the AC source 30. FIGS. 4b, 4c, 4d, 4e and 4f show amplitude variations. With conduction firing of the controlled rectifiers 48 and 54 occurring at the 90° phase point, the amplitude is varied by adjustment of the series resistors 44 and 50 so that with a minimum resistance a maximum amplitude results, as illustrated in FIG. 4b; with a medium resistance the amplitude in FIG. 4c occurs; and with a maximum resistance the minimum amplitude portrayed in FIG. 4d will be generated.

At the 135° phase point it will be noted that the output pulse in FIG. 4e is very narrow and occurs at a point where the output voltage from the source 30 is rapidly decreasing. This can result in the pulse supplied to the gap being at a lower voltage than desired. To increase this voltage so that it will appear as illustrated by the broken line in FIG. 4e, the series diodes 46 and 52 and parallel capacitors 56 and 58 are employed. During the time when one of the controlled rectifiers 48 or 54 is nonconductive the associated capacitor 56 or 58 will be charging. Of course, the rectifiers 46 and 52 facilitate this charging by supplying only unilateral current to the capacitors 56 and 58. Subsequently, when the controlled rectifiers 48 and 54 are fired; e.g., the controlled rectifier 48, additional voltage from the capacitor 56 is applied to the gap and this raises or increases the amplitude of the gap pulse to that illustrated by the broken line in FIG. 4e.

With the just-described pulse amplitude increasing technique, it is possible, as illustrated in FIG. 4f, to obtain multiple pulses. This is done by adjusting the RC time constant of the combination of the resistor 44 and the capacitor 56 and the combination of the resistor 50 and the capacitor 58 so as to be shorter than the related controlled rectifier's on-time. Consequently, the capacitors 56 and 58 will be discharged faster than the on-time of their related controlled rectifier. For example, after the capacitor 56 discharges and the gap discharge has terminated, leakage current external to the gap will be adequate to maintain the controlled rectifier 48 conductive. The capacitor 56 will then recharge to an extent determined by the resistive value of the resistor 44, and upon attaining the required voltage the gap will break down once again and produce the second pulse as viewed in FIG. 4f. Thus, multiple pulses can be obtained with the proper on-time of their related controlled rectifier 54 or 48.

To facilitate the versatility of the apparatus and offer protection against damage to the workpiece 12 from short circuits, particularly when the workpiece 12 is a cutting die that is being precisely formed by short pulses, a voltage detector, denoted generally at 78, is employed. This voltage detector may be of the type shown and described in the copending application Ser. No. 576,019 to John J. Ross, filed Aug. 30, 1966, and entitled "Electrical Discharge Machining Apparatus." Briefly, the voltage detector 78 is connected across the gap and may employ some type of switching device, such as a switching transistor, not shown, that becomes conductive when the gap voltage decreases to a certain minimum, characteristic of a short circuit condition. This switching transistor in turn may control a relay, not shown, which disconnects the shaping and switching network 74 both from the gate electrodes of the controlled rectifiers 48 and 54 and the flip-flop 76.

This voltage detector 78 presents the problem of automatically restarting the apparatus, and this is one of the functions of the motor control winding 36. The motor control winding 36 is in series with a rectifier 80 and an adjustable resistor 82 and is connected across the gap. As soon as the condition producing the short circuit has been dissipated, this winding 36 will impose a voltage across the gap that will be high enough to cause the voltage detector 78 to again become inoperative. For example, the switching transistor would be biased to a nonconductive state and cause the shaping and switching network 74 to be reconnected to the gate electrodes of the controlled rectifiers 48 and 54. The current from this winding 36, however, is minimal because the resistor 82 is adjusted so as to provide high resistance. Also, the voltage from the winding 36 is lower than the voltage needed to produce a true gap discharge.

The other function of this winding 36 is, as has been suggested, to aid in the operation of the gap spacing control 16. This can best be explained by referring to FIG. 5a where the waveform of the output pulse from the source 30 and the phase point at 120° of the voltage excursion are illustrated. In FIG. 5b the waveform in the solid line represents that of the gap discharge when the conduction firing point is at 120°. As can be appreciated, narrow pulses somewhat widely spaced can result in an average gap voltage that is quite low and this renders the control 16 erratic and unstable. To overcome this problem, the additional voltage from the winding 36 is utilized so that during the period when the controlled rectifiers 48 and 54 are nonconductive, the motor control winding 36 imposes the voltage shown in broken lines on the gap. The result is an increase in the average voltage across the gap. This increased average voltage renders the gap spacing control 16 more stable. Otherwise, only slight changes in a very low gap voltage would produce large gap spacing corrections with resulting hunting, etc.

Summarizing the operation, the cutting tool 10 and the workpiece 12 are first positioned relative to each other and the gap spacing control 16 adjusted for the desired gap spacing. The AC source 30 is then turned on. If the AC source 30 has an output frequency of 10 kilocycles, then it will initially be assumed that this is the frequency at which the discharges are to occur across the gap. Hence, the trigger circuit 64 is adjusted so that the switch 68 is in the half-wave rectification position illustrated, and the shaping and switching network 74 is adjusted so that trigger pulses are delivered directly to the controlled rectifiers 48 and 54. Since, as explained, the polarities of the two cutting windings 40 and 42 are opposite, only one of the windings 40 or 42 will be effective and pulses will be applied to the gap at this 10 kc. frequency. These pulses will appear as shown in FIG. 2b and have, determined by the adjustment of the RC network 70 in the trigger circuit 64, one of the widths shown in FIGS. 3b, 3c or 3d and one of the amplitudes seen in FIGS. 4b, 4c, 4d, 4e or 4f, determined by the adjustment of the resistors 44 and 50.

If the gap conditions produce a short circuit the voltage across the gap voltage will decrease until the voltage detector 78 becomes effective to interrupt the application of the trigger pulses to the controlled rectifiers 48 and 54. As soon as this short circuit condition is cleared the voltage from the motor control winding 36 will be effective to bias the voltage detector 78 off and the machining and application of pulsating energy to the gap will be resumed.

If next it is desired to switch to 20 kc. operation, the trigger circuit's switch 68 is moved to the broken line position and the shaping and switching network 74 maintained in the same position with the flip-flop 76 bypassed. With the two cutting windings 40 and 42 having opposite polarities, first one and then the other will have the proper polarity for conduction of the associated controlled rectifier when triggered on and the pulses provided to the gap will appear as shown in FIG. 2c and be at the 20 kc. or double the frequency of the AC source 30; i.e., there will be a pulse provided for each half-cycle of the input source 30. Again the condition firing point will determine the width of discharge pulse and the adjustment of the resistors 44 and 50 the amplitude.

The 5 kc. operation requires a return of the trigger circuit switch 68 to the half-wave rectification position, illustrated by the solid line in FIG. 1, and that the shaping and switching network 74 be changed so that the trigger pulses from the trigger circuit 64 are delivered only to the input of the flip-flop 76. An output from the flip-flop 76 will be supplied to the controlled rectifiers 48 and 54 only on every other cycle of the AC source 30 and the pulses delivered to the gap will have the 5 kc. frequency illustrated in FIG. 2d with widths and amplitudes as mentioned.

From the foregoing, it will be appreciated that electrical discharge machining apparatus is provided having considerable versatility for many diverse applications. The parameters of the voltage applied to the gap can be varied as to frequency, amplitude and duration; thus permitting many different materials to be machined with different degrees of precision as well as different finishes. Compensation is made for narrow pulse operation so that stable gap spacing control is possible and short circuiting conditions are detected and allowed to clear while the power is shut off. The machining is recommenced as soon as the short circuit condition is cleared.

The invention is to be limited only by the following claims.

What is claimed is:

1. In electrical discharge machining apparatus, the combination of relatively movable cutting tool and workpiece electrodes spaced apart so as to form a machining gap therebetween, means supplying electric power to the gap for machining the workpiece, the power supply means including an AC source, circuit means operative to couple the AC source across the gap, the circuit means including a transformer having a primary winding connected to the AC source and a secondary winding connected across the gap, a controlled rectifier in series with the secondary winding, control means operated in synchronism with the AC source for rendering the controlled rectifier conductive so that a machining pulse is supplied to the gap commencing at a certain phase of the cycle of the AC source, the control means including a triggering device energized by the AC source for developing trigger pulses of a variable commencement time relative to the phase of the AC source for varying the conduction time of the controlled rectifier relative to the cycle time of the AC source and for rendering the controlled rectifier conductive at a frequency related to the frequency of the AC source and means varying the frequency of the trigger pulses, and including means maneuvering the cutting tool and workpiece electrodes relative to each other in response to the average gap voltage and wherein the circuit means includes another secondary winding connected across the gap so as to increase the gap voltage between discharges and thereby increase the average gap voltage.

2. The electrical discharge machining apparatus described in claim 1 including detector means operative in response to a certain minimum gap voltage characterizing a short circuit condition in the gap to render the controlled rectifier inoperative thereby interrupting the supply of machining pulses to the gap, the other secondary winding being effective to increase the gap voltage when the short circuit condition is dissipated so that the detector means is rendered inoperative and the controlled rectifier operative.

References Cited

UNITED STATES PATENTS 3,307,094     2/1967     Ogle.

JOSEPH V. TRUHE, Primary Examiner

M. C. FLIESLER, Assistant Examiner

PO-1050
(5/69)

UNITED STATES PATENT OFFICE
CERTIFICATE OF CORRECTION

Patent No. 3,517,154          Dated June 23, 1970

Inventor(s) August F. Scarpelli, Millard A. Ferguson & John J. Ros

It is certified that error appears in the above-identified patent and that said Letters Patent are hereby corrected as shown below:

In Column 2, line 19, "shock" should be changed to -- stock --.

In Column 3, line 29, after "switching" insert -- function --.

In Column 8, in the references, after "3,307,094 2/1967 Ogle" insert -- 3,129,357 4/1964 Ullmann et al, 3,161,752 12/1964 Stuart, 3,211,882 10/1965 Webb et al, 3,264,517 8/1966 Ullman et al, 3,328,635 6/1967 Webb --

(SEAL)
Attest:

Edward M. Fletcher, Jr.
Attesting Officer

WILLIAM E. SCHUYLER, JR.
Commissioner of Patents